(12) United States Patent
Li et al.

(10) Patent No.: US 10,223,570 B2
(45) Date of Patent: Mar. 5, 2019

(54) MUTUAL-CAPACITANCE TOUCH SENSING PATTERN RECOGNITION DEVICE, FABRICATING METHOD THEREOF, RELATED DISPLAY PANEL, AND RELATED DISPLAY APPARATUS

(71) Applicants: BOE TECHNOLOGY GROUP CO., LTD, Beijing (CN); BEIJING BOE OPTOELECTRONICS TECHNOLOGY CO., LTD., Beijing (CN)

(72) Inventors: Changfeng Li, Beijing (CN); Xue Dong, Beijing (CN); Haisheng Wang, Beijing (CN); Xiaochuan Chen, Beijing (CN); Lei Wang, Beijing (CN); Weijie Zhao, Beijing (CN); Shengji Yang, Beijing (CN); Xiaoliang Ding, Beijing (CN); Wei Liu, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 44 days.

(21) Appl. No.: 15/122,904

(22) PCT Filed: Feb. 22, 2016

(86) PCT No.: PCT/CN2016/074218
§ 371 (c)(1),
(2) Date: Aug. 31, 2016

(87) PCT Pub. No.: WO2017/031965
PCT Pub. Date: Mar. 2, 2017

(65) Prior Publication Data
US 2017/0262683 A1    Sep. 14, 2017

(30) Foreign Application Priority Data

Aug. 26, 2015   (CN) .......................... 2015 1 0531622

(51) Int. Cl.
*G06K 9/00* (2006.01)
*G06F 3/044* (2006.01)

(52) U.S. Cl.
CPC ........... *G06K 9/0002* (2013.01); *G06F 3/044* (2013.01); *G06K 9/0008* (2013.01); *G06F 2203/04103* (2013.01)

(58) Field of Classification Search
None
See application file for complete search history.

(56) References Cited

U.S. PATENT DOCUMENTS

2005/0031174 A1    2/2005   Ryhanen et al.
2008/0247613 A1   10/2008   Chang
(Continued)

FOREIGN PATENT DOCUMENTS

CN    1802882 A     7/2006
CN    101281589 A   10/2008
(Continued)

OTHER PUBLICATIONS

The World Intellectual Property Organization (WIPO) International Search Report and Written Opinion for PCT/CN2016/074218 May 6, 2016 14 Pages.
(Continued)

*Primary Examiner* — Idowu O Osifade
(74) *Attorney, Agent, or Firm* — Anova Law Group, PLLC (57) ABSTRACT

In accordance with various embodiments, the disclosed subject matter provides a mutual-capacitance touch sensing pattern recognition device, a related fabricating method, a related display panel, and a related display apparatus. The
(Continued)

mutual-capacitance touch sensing pattern recognition device can comprise a plurality of sensing electrode lines and a plurality of driving electrode lines, wherein at least one set of the plurality of sensing electrode lines and the plurality of driving electrode lines have curved portions.

20 Claims, 7 Drawing Sheets

(56) References Cited

U.S. PATENT DOCUMENTS

| | | |
|---|---|---|
| 2014/0035864 A1 | 2/2014 | Chang et al. |
| 2014/0152604 A1 | 6/2014 | Westerman |
| 2015/0091849 A1* | 4/2015 | Ludden ............... G06F 3/0412 345/174 |
| 2015/0242051 A1* | 8/2015 | Ng ..................... G06F 3/0418 345/174 |
| 2016/0042215 A1 | 2/2016 | Wang et al. |
| 2016/0342234 A1* | 11/2016 | Xu ........................ G06F 3/044 |
| 2017/0103251 A1 | 4/2017 | Liu et al. |
| 2017/0308205 A1* | 10/2017 | Cheng ................... G06F 3/044 |

FOREIGN PATENT DOCUMENTS

| | | |
|---|---|---|
| CN | 103530609 A | 1/2014 |
| CN | 103577005 A | 2/2014 |
| CN | 203773561 U | 8/2014 |
| CN | 104182102 A | 12/2014 |
| CN | 104794454 A | 7/2015 |
| CN | 105138988 A | 12/2015 |
| WO | 2017031965 A1 | 3/2017 |

OTHER PUBLICATIONS

State Intellectual Property Office of the P.R.0 (SIPO) Office Action 1 for 201510531622.1 Jan. 10, 2018 22 Pages (including translation).

* cited by examiner

MUTUAL-CAPACITANCE TOUCH SENSING PATTERN RECOGNITION DEVICE, FABRICATING METHOD THEREOF, RELATED DISPLAY PANEL, AND RELATED DISPLAY APPARATUS

CROSS-REFERENCES TO RELATED APPLICATIONS

This patent application is a national phase entry under 35 U.S.C. § 371 of International Application No. PCT/CN2016/074218, filed on Feb. 22, 2016, which claims priority to Chinese Patent Application No. 201510531622.1, filed on Aug. 26, 2015. The above enumerated patent applications are incorporated by reference herein in their entirety.

TECHNICAL FIELD

The disclosed subject matter generally relates to the display technologies and, more particularly, relates to a mutual-capacitance fingerprint recognition device, related fabricating method thereof, a display panel containing the same, and a display apparatus containing the same.

BACKGROUND

Human fingerprint is an innate, unique, and invariant feature that can be used for distinguishing individuals. A fingerprint includes patterns, which are aggregate characteristics of ridges and valleys on the skin surface of a finger. The three basic patterns of fingerprint ridges are the arch, loop, and whorl. A fingerprint pattern can include many minutia features, such as ridge ending, ridge bifurcation, arch, tented arch, left-handed whorl, right-handed whorl, double whorl, and other details, which can determine the uniqueness of the fingerprint pattern.

Along with the development of the computer application and the pattern recognition theory, computer-based automatic fingerprint recognition techniques have been researched and developed all around the world.

Mutual-capacitance fingerprint recognition devices include driving electrodes Tx and sensing electrodes Rx. The driving electrodes Tx and the sensing electrodes Rx are often linear, and they are thus often referred to as Tx lines and Rx lines, respectively. Mutual-capacitance fingerprint recognition devices use the Tx lines and Rx lines to measure the capacitance differences among various locations of a fingerprint. It is desirable to provide new mutual-capacitance fingerprint recognition devices, new fabricating method thereof, related display panel, and related display apparatus to improve the accuracy of the fingerprint recognition results.

BRIEF SUMMARY

In accordance with various embodiments, the disclosed subject matter provides a mutual-capacitance touch sensing pattern recognition device, a related fabricating method, a related display panel, and a related display apparatus.

An aspect of the present disclosure provides a mutual-capacitance touch sensing pattern recognition device, comprising a plurality of sensing electrode lines and a plurality of driving electrode lines, wherein at least one set of the plurality of sensing electrode lines and the plurality of driving electrode lines have curved portions.

In some embodiments, both sets of the plurality of sensing electrode lines and the plurality of driving electrode lines have curved portions.

In some embodiments, each of the plurality of sensing electrode lines has a plurality of wave-shaped convexes.

In some embodiments, each of the plurality of driving electrode lines has a plurality of wave-shaped convexes.

In some embodiments, the plurality of wave-shaped convexes are evenly spaced.

In some embodiments, each of the plurality of wave-shaped convexes is a hemispherical convex.

In some embodiments, the hemispherical convex has a diameter of about 1 µm and 10 µm and a depth of about 1 µm and 10 µm.

In some embodiments, the mutual-capacitance touch sensing pattern recognition device further comprises a glass substrate and a glass cover, and a first resin layer between the plurality of sensing electrode lines and the glass cover, wherein the first resin layer comprises a plurality of wave-shaped concaves that correspond with the plurality of wave-shaped convexes of the plurality of sensing electrode lines.

In some embodiments, the mutual-capacitance touch sensing pattern recognition device further comprises a second resin layer between the plurality of sensing electrode lines and the plurality of driving electrode lines, wherein the second resin layer comprises a plurality of wave-shaped concaves that correspond with the plurality of wave-shaped convexes of the plurality of driving electrode lines.

In some embodiments, each of the plurality of sensing electrode lines comprises a sensing electrode main line, a first sensing electrode branch on a first side of the sensing electrode main line, and a second sensing electrode branch on a second side of the sensing electrode main line.

In some embodiments, the sensing electrode main line is a wavy line.

In some embodiments, the first sensing electrode branch and the second sensing electrode branch are wavy lines.

In some embodiments, each of the plurality of driving electrode lines comprises a driving electrode main line, a first driving electrode branch on a first side of the driving electrode main line, and a second driving electrode branch on a second side of the driving electrode main line.

In some embodiments, the driving electrode main line is a wavy line.

In some embodiments, the first driving electrode branch and the second driving electrode branch are wavy lines.

In some embodiments, the plurality of sensing electrode lines are parallel with each other, the plurality of driving electrode lines are parallel with each other, and the plurality of sensing electrode lines are perpendicular with the plurality of driving electrode lines.

In some embodiments, a distance between neighboring sensing electrode lines is between 30 µm and 120 µm, and a distance between neighboring driving electrode lines is between 30 µm and 120 µm.

Another aspect of the present disclosure includes a display panel comprising the disclosed mutual-capacitance touch sensing pattern recognition device.

Another aspect of the present disclosure includes a display apparatus comprising the disclosed display.

Another aspect of the present disclosure includes a method for fabricating a disclosed mutual-capacitance touch sensing pattern recognition device. The method comprises: preparing a glass substrate and a glass cover; and forming a plurality of sensing electrode lines and a plurality of driving electrode lines between the glass substrate and the glass cover; wherein at least one set of the plurality of sensing electrode lines and the plurality of driving electrode lines have curved portions.

In some embodiments, both sets of the plurality of sensing electrode lines and the plurality of driving electrode lines have curved portions.

In some embodiments, the curved portions are evenly spaced wave-shaped convexes.

In some embodiments, each of the plurality of wave-shaped convexes is a hemispherical convex that has a diameter between 1 μm and 10 μm and a depth between 1 μm and 10 μm.

In some embodiments, the method further comprises forming a first resin layer between the plurality of sensing electrode lines and the glass cover, wherein the first resin layer comprises a plurality of wave-shaped concaves that correspond with the plurality of wave-shaped convexes of the plurality of sensing electrode lines.

In some embodiments, the method further comprises forming a second resin layer between the plurality of sensing electrode lines and the plurality of driving electrode lines, wherein the second resin layer comprises a plurality of wave-shaped concaves that correspond with the plurality of wave-shaped convexes of the plurality of driving electrode lines.

In some embodiments, each of the plurality of sensing electrode lines comprising: a sensing electrode main line; a first sensing electrode branch on a first side of the sensing electrode main line; and a second sensing electrode branch on a second side of the sensing electrode main line.

In some embodiments, each of the plurality of driving electrode lines comprising: a driving electrode main line; a first driving electrode branch on a first side of the driving electrode main line; and a second driving electrode branch on a second side of the driving electrode main line.

In some embodiments, the plurality of sensing electrode lines are parallel with each other; the plurality of driving electrode lines are parallel with each other; and the plurality of sensing electrode lines are perpendicular with the plurality of driving electrode lines.

Other aspects of the present disclosure can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the disclosed subject matter, reference will now be made in detail to exemplary embodiments of the disclosed subject matter, which are illustrated in the accompanying drawings. Wherever possible, the same reference numbers will be used throughout the drawings to refer to the same or like parts.

In accordance with various embodiments, the disclosed subject matter provides a mutual-capacitance fingerprint recognition device, a related fabricating method, a related display panel, and a related display apparatus.

Figures 1, 2:
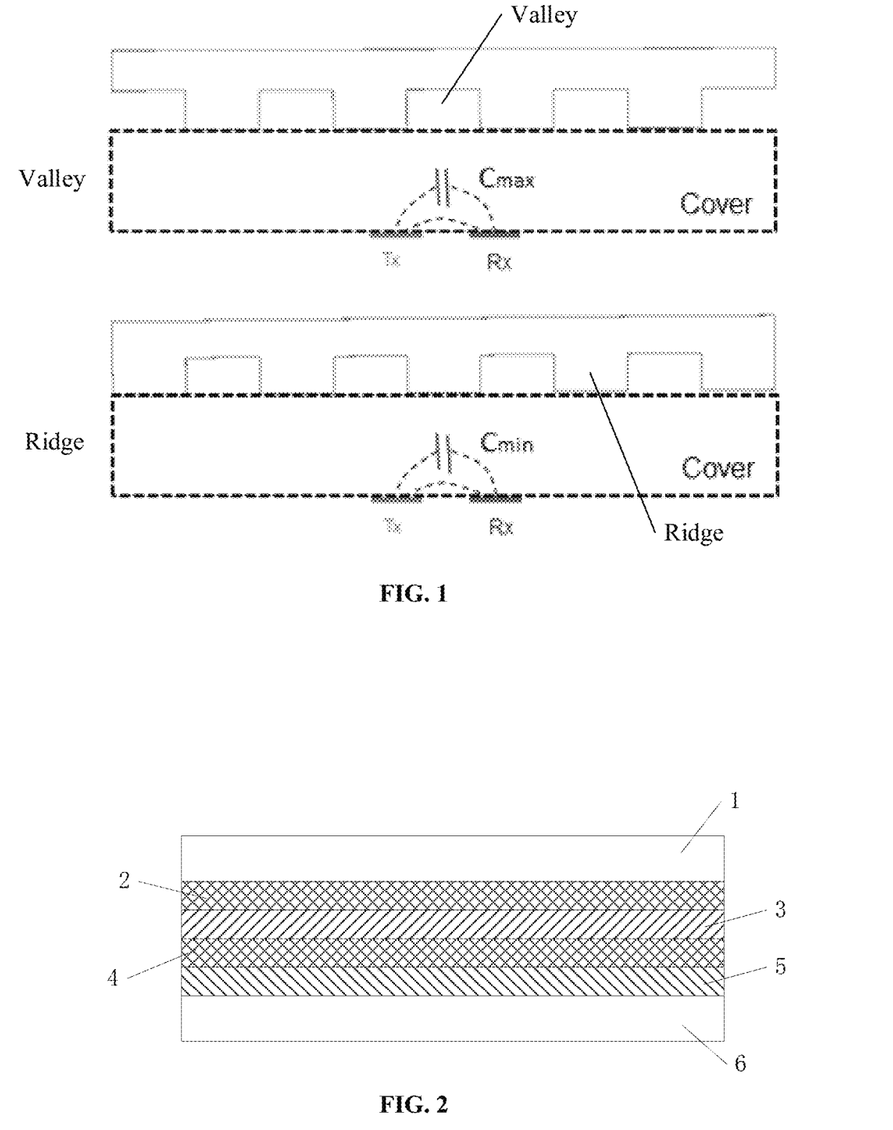
FIG. 1 is a schematic diagram illustrating basic principles of a mutual-capacitance fingerprint recognition device.
FIG. 2 is a cross-sectional view of an exemplary mutual-capacitance fingerprint recognition device in accordance with some embodiments of the disclosed subject matter.

The basic principle of a mutual capacitance fingerprint recognition device can be illustrated in FIG. 1. The driving electrodes Tx provide low-voltage high-frequency signals, while the sensing electrodes Rx receive low-voltage high-frequency signals, so that a stable capacitance can be measured between the driving electrodes and the sensing electrodes. The driving electrodes Tx and the sensing electrodes Rx are often linear, and they are thus often referred to as Tx lines and Rx lines, respectively.

When a finger touches the fingerprint recognition device, the finger and the fingerprint recognition device can form an equivalent capacitance. If human body is grounded, the low-voltage high-frequency signals can flow into the ground through the equivalent capacitance, and capacitance between the driving electrodes and the sensing electrodes can thereby be reduced. The low-voltage high-frequency signals emitted from the driving electrodes Tx can be understood as electric field lines emitted from the driving electrodes, while the low-voltage high-frequency signals received by the sensing electrodes Rx can be understood as electric field lines received by the sensing electrodes.

When a finger touches the fingerprint recognition device, the valleys on a fingerprint are located relatively far away from the Tx lines and Rx lines. So few electric field lines can be absorbed by the valleys, and a large capacitance value Cmax between the Tx lines and the Rx lines can be measured at the valleys' locations. The ridges are located relatively close to the Tx lines and the Rx lines. So more electric field lines can be absorbed by the ridges, and a small capacitance value Cmin between the Tx lines and Rx lines can be measured at the ridges' locations.

The valleys and ridges of the fingerprint can be identified and distinguished by detecting different capacitance values ΔC=Cmax−Cmin of the fingerprint recognition device. ΔC can be understood as a sensitivity of fingerprint recognition. The difference ΔC between Cmax and Cmin is relatively small in current fingerprint recognition devices, resulting in a lower sensitivity of fingerprint recognition, which means it is not easy to distinguish the valleys and the ridges in a fingerprint.

FIG. 2 shows a cross-sectional view of an exemplary mutual-capacitance fingerprint recognition device in accordance with some embodiments of the disclosed subject matter.

As illustrated, a mutual-capacitance fingerprint recognition device can include glass cover 1, first resin layer 2, sensing electrode 3, second resin layer 4, driving electrode 5, and glass substrate 6.

In some embodiments, first resin layer 2 is located between glass cover 1 and sensing electrode 3, second resin layer 4 is located between sensing electrode 3 and driving electrode 5. First resin layer 2 and second resin layer 4 can be made of any suitable resin materials, such as Optically Clear Adhesive (OCA) resin. The OCA resin is an insulating material.

It should be noted that the thicknesses of the different layers shown in FIG. 2 does not reflect the true proportions and the shapes of the described subject matters. It also should be noted that the positions of the sensing electrode 3 and the driving electrode 5 can be exchanged. FIG. 2 is merely a schematic illustration of the structure of an exemplary mutual-capacitance fingerprint recognition device in according to the described subject matters and is not intended to limit the scope of the present disclosure.

Sensing electrode 3 and driving electrode 5 can form a capacitor group. When glass cover 1 is contacted by a finger which is a conductor, the capacitor changes due to the height differences between ridges and valleys of the fingerprint. The valleys and the ridges have different distances from the capacitor, and can cause different changes of the capacitance. By detecting the changes of current or voltage between drive electrodes 5 and sensing electrode 3, the positions of valleys and ridges can be recognized. A reconstruction of the fingerprint image can be obtained by arranging a two-dimensional high-density electrodes matrix.

In some embodiments, sensing electrode 3 and/or driving electrode 5 can have any suitable curved structures.

As a first example, in a direction perpendicular to glass cover 1, sensing electrode 3 can have wave-shaped convexes toward glass cover 1. In a projection plane parallel to glass cover 1, sensing electrode 3 and driving electrode 5 can have linear structures.

As a second example, in a direction perpendicular to glass cover 1, driving electrode 5 can have wave-shaped convexes toward glass cover 1. In a projection plane parallel to glass cover 1, sensing electrode 3 and driving electrode 5 can have linear structures.

As a third example, in a direction perpendicular to glass cover 1, sensing electrode 3 and driving electrode 5 can both have wave-shaped convexes toward glass cover 1. In a projection plane parallel to glass cover 1, sensing electrode 3 and driving electrode 5 can have linear structures.

As a fourth example, in a direction perpendicular to glass cover 1, sensing electrode 3 can have wave-shaped convexes toward glass cover 1. In a projection plane parallel to glass cover 1, sensing electrode 3 can have a wave-shaped structure.

As a fifth example, in a direction perpendicular to glass cover 1, driving electrode 5 can have wave-shaped convexes toward glass cover 1. In a projection plane parallel to glass cover 1, sensing electrode 3 can have a wave-shaped structure.

As a sixth example, in a direction perpendicular to glass cover 1, sensing electrode 3 and driving electrode 5 can have wave-shaped convexes toward glass cover 1. In a projection plane parallel to glass cover 1, sensing electrode 3 can have a wave-shaped structure.

As a seventh example, in a direction perpendicular to glass cover 1, sensing electrode 3 can have wave-shaped convexes toward glass cover 1. In a projection plane parallel to glass cover 1, driving electrode 5 can have a wave-shaped structure.

As a eighth example, in a direction perpendicular to glass cover 1, driving electrode 5 can have wave-shaped convexes toward glass cover 1. In a projection plane parallel to glass cover 1, driving electrode 5 can have a wave-shaped structure.

As a ninth example, in a direction perpendicular to glass cover 1, sensing electrode 3 and driving electrode 5 can both have wave-shaped convexes toward glass cover 1. In a projection plane parallel to glass cover 1, driving electrode 5 can have a wave-shaped structure.

As a tenth example, in a direction perpendicular to glass cover 1, sensing electrode 3 can have wave-shaped convexes toward glass cover 1. In a projection plane parallel to glass cover 1, sensing electrode 3 and driving electrode 5 can both have wave-shaped structures.

As a eleventh example, in a direction perpendicular to glass cover 1, driving electrode 5 can have wave-shaped convexes toward glass cover 1. In a projection plane parallel to glass cover 1, sensing electrode 3 and driving electrode 5 can both have wave-shaped structures.

As a twelfth example, in a direction perpendicular to glass cover 1, sensing electrode 3 and driving electrode 5 can both have wave-shaped convexes toward glass cover 1. In a projection plane parallel to glass cover 1, sensing electrode 3 and driving electrode 5 can both have wave-shaped structures.

As a thirteenth example, in a direction perpendicular to glass cover 1, sensing electrode 3 and driving electrode 5 do not have wave-shaped convexes toward glass cover 1. In a projection plane parallel to glass cover 1, sensing electrode 3 can have a wave-shaped structure.

As a fourteenth example, in a direction perpendicular to glass cover 1, sensing electrode 3 and driving electrode 5 do not have wave-shaped convexes toward glass cover 1. In a projection plane parallel to glass cover 1, driving electrode 5 can have a wave-shaped structure.

As a fifteenth example, in a direction perpendicular to glass cover 1, sensing electrode 3 and driving electrode 5 do not have wave-shaped convexes toward glass cover 1. In a projection plane parallel to glass cover 1, sensing electrode 3 and driving electrode 5 can both have wave-shaped structures.

In some embodiments, the twelfth example described above can have a good effective fingerprint recognition ability. The areas of sensing electrode 3 and driving electrode 5 can be greatly increased when sensing electrode 3 and driving electrode 5 can have wave-shaped convexes toward glass cover 1 in a direction perpendicular to glass cover 1, and have wave-shaped structures in a projection plane parallel to glass cover 1. In this case, the capacitance difference value $\Delta C$ can be greatly increased, and the fingerprint recognition ability may be greatly improved.

Particularly, in one embodiment, in a direction perpendicular to glass cover 1, sensing electrode 3 has multiple wave-shaped convexes toward glass cover 1. First resin layer 2 between glass cover 1 and sensing electrode 3 has multiple wave-shaped concaves that correspond to the multiple wave-shaped convexes of sensing electrode 3 respectively. In the direction perpendicular to glass cover 1, driving electrode 5 also has wave-shaped convexes toward glass cover 1. Second resin layer 4 between sensing electrode 3 and driving electrode 5 has multiple wave-shaped concaves that correspond to the multiple wave-shaped convexes of driving electrode 5 respectively.

In some embodiments, the distances between neighboring wave-shaped convexes of sensing electrode 3 and/or driving electrode 5 may be the same. The distance may be between 5 μm and 10 μm. The wave-shaped convexes can be either cube-like convexes or hemispherical convexes. Optionally, each of the wave-shaped convexes is a hemispherical convex. The hemispherical convex can have a diameter between 1 μm and 10 μm, and a depth between 1 μm and 10 μm. In some embodiments, the depth of the hemispherical convex can be determined by a thickness of the resin layer and an etching depth of an etching process.

Figure 3:
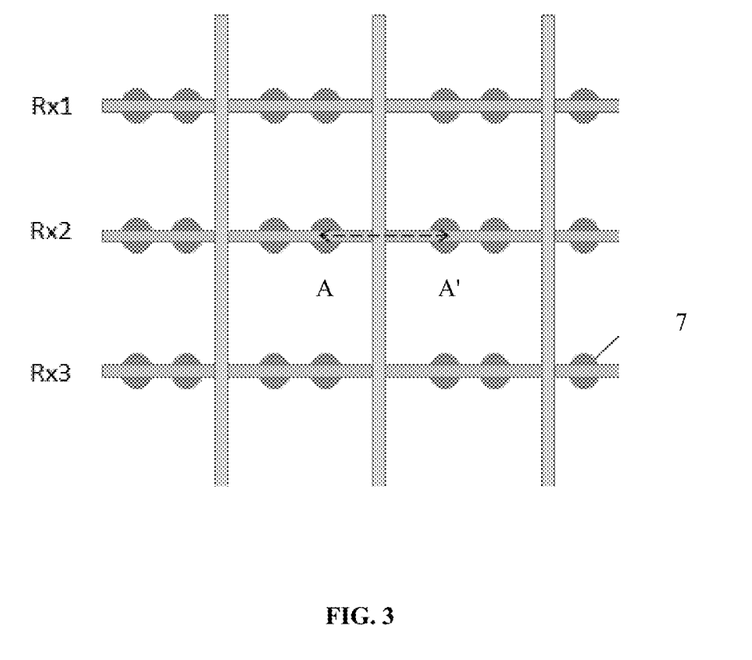
FIG. 3 is a top view of an exemplary mutual-capacitance fingerprint recognition device in accordance with some embodiments of the disclosed subject matter.

Turning to FIG. 3, a top view of the first exemplary mutual-capacitance fingerprint recognition device is shown in accordance with some embodiments of the disclosed subject matter. As illustrated, sensing electrode lines Rx are arranged in the AA' direction, driving electrode lines Tx are arranged in a direction that is perpendicular to the AA' direction. Sensing electrode lines Rx have multiple wave-shaped convexes 7. Sensing electrode Rx and driving electrode lines Tx can have linear structures in a projection plane parallel to glass cover 1.

Figure 4:
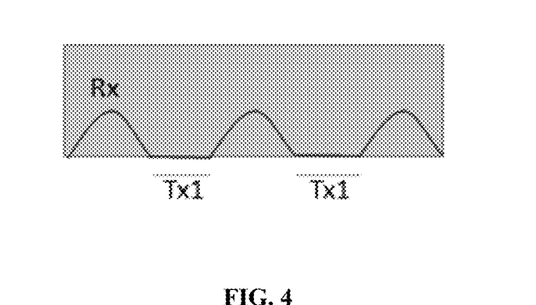
FIG. 4 is a cross-sectional view of a Rx line along AA' direction of the mutual-capacitance fingerprint recognition device shown in FIG. 3 in accordance with some embodiments of the disclosed subject matter.
Figure 5:
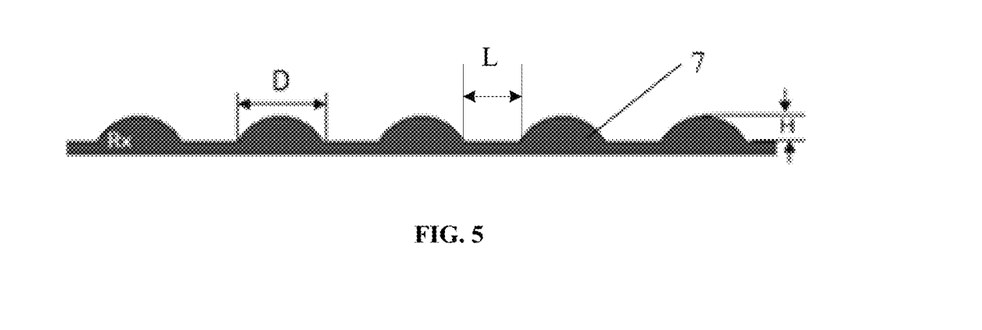
FIG. 5 is a projection view of the Rx line shown in FIG. 4 in accordance with some embodiments of the disclosed subject matter.

Turning to FIG. 4, a schematic structural cross-sectional view of a Rx line along AA' direction is shown. FIG. 5 is a schematic projection view of the Rx line shown in FIG. 4 in a plane that is perpendicular to the glass substrate and parallel to the Rx line. As illustrated, a wave-shaped convex 7 can have diameter D between 1 μm and 10 μm, and depth H between 1 μm and 10 μm. Distance L between neighboring wave-shaped convexes 7 may be between 5 μm and 10 μm.

Figure 6:
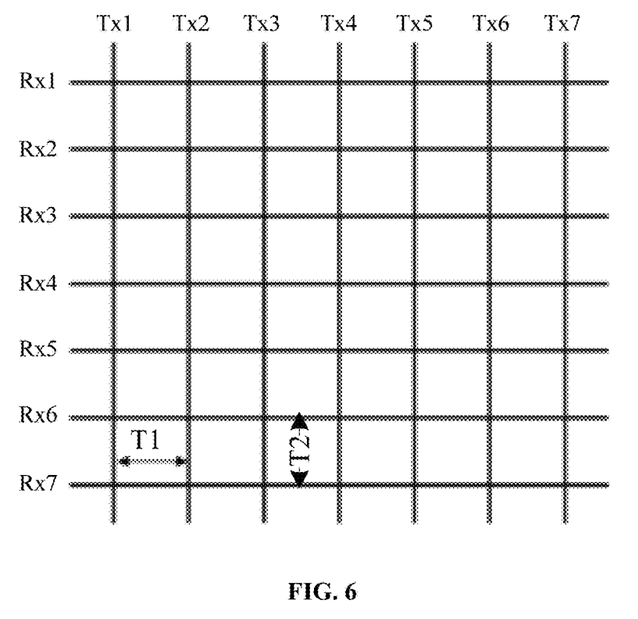
FIG. 6 is a diagram of the Rx lines and the Tx lines of the mutual-capacitance fingerprint recognition device shown in FIG. 3 in accordance with some embodiments of the disclosed subject matter.

Turning to FIG. 6, a schematic diagram of the Rx lines and the Tx lines is shown in accordance with some embodiments of the disclosed subject matter. In some embodiments, the distance between valleys and ridges of a human fingerprint is about 300 μm to 400 μm. In order to reconstructing the fingerprint, a distance between two adjacent driving electrode lines Tx and/or sensing electrode lines Rx would not be greater than the distance between valleys and ridges. Referring to FIG. 6, for example, distance T1 between adjacent Tx lines is between 30 μm and 120 μm, distance T2 between adjacent Rx lines is between 30 μm and 120 μm.

FIGS. 7-13 are schematic diagrams of several exemplary structures of Rx lines and Tx lines of a mutual-capacitance fingerprint recognition device in accordance with some embodiments of the disclosed subject matter.

Figure 7:
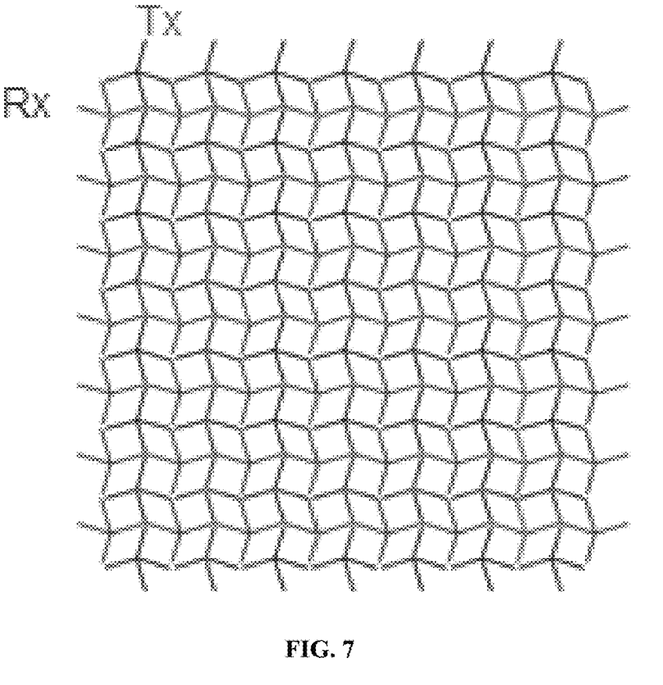
FIG. 7 is a diagram of a first exemplary structure of Rx lines and Tx lines of a mutual-capacitance fingerprint recognition device in accordance with some embodiments of the disclosed subject matter.

A first exemplary structure of Rx lines and Tx lines is shown in FIG. 7. As illustrated, Tx lines are extending along a first direction, while Rx lines are extending along a second direction. The first direction and the second direction are perpendicular to each other. Each of the Tx lines includes three parts, which are a Tx main line, a first Tx branch, and a second Tx branch. The Tx main line is extending in the first direction. The first Tx branch is located on one side of the Tx main line and is between two adjacent Rx lines. The second Tx branch is located on the other side of the Tx main line and is also between the two adjacent Rx lines. Both the first Tx branch and the second Tx branch have a length larger than a half of the distance between two adjacent Tx lines.

Figure 8:
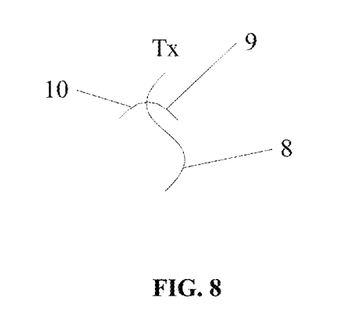
FIG. 8 is a diagram showing an expanded view of a partial of a Tx line illustrated in FIG. 7 in accordance with some embodiments of the disclosed subject matter.

Particularly, a schematic diagram showing an expanded view of a portion of a Tx line is shown in FIG. 8. Each of the Tx lines includes Tx main line 8, first Tx branch 9, and second Tx branch 10.

Referring back to FIG. 7, each of the Rx lines includes three parts, which are a Rx main line, a first Rx branch, and a second Rx branch. The Rx main line is extending in the second direction. The first Rx branch is located on one side of the Rx main line and is between two adjacent Tx lines. The second Rx branch is located on the other side of the Rx main line and is also between the two adjacent Tx lines. Both the first Rx branch and the second Rx branch have a length larger than a half of the distance between two adjacent Rx lines.

Figure 9:
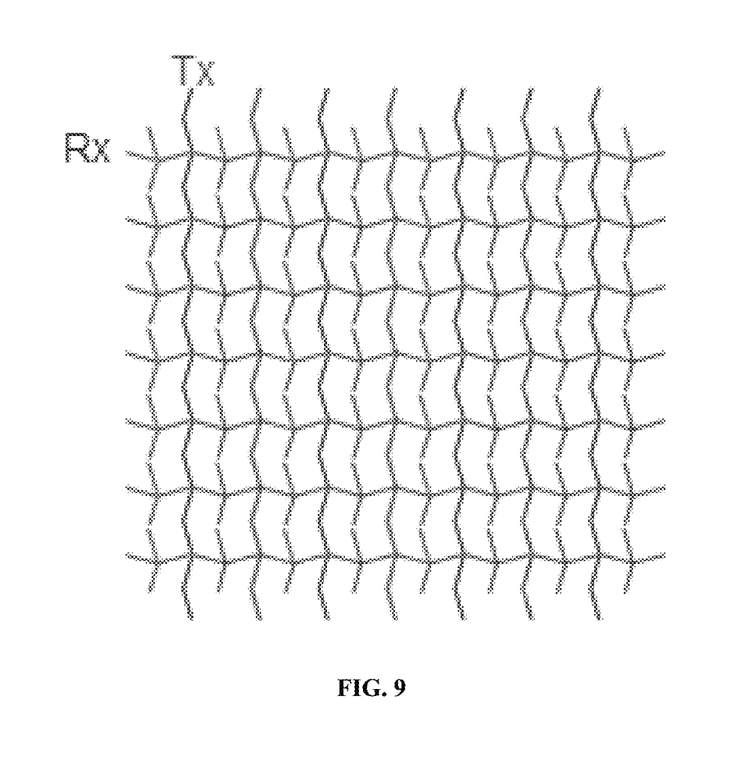
FIG. 9 is a diagram of a second exemplary structure of Rx lines and Tx lines of a mutual-capacitance fingerprint recognition device in accordance with some embodiments of the disclosed subject matter.

A second exemplary structure of Rx lines and Tx lines is shown in FIG. 9. Comparing to the first exemplary structure shown in FIG. 7, in the second exemplary structure, each of the Tx lines only includes a Tx main line but no branch lines.

Figure 10:
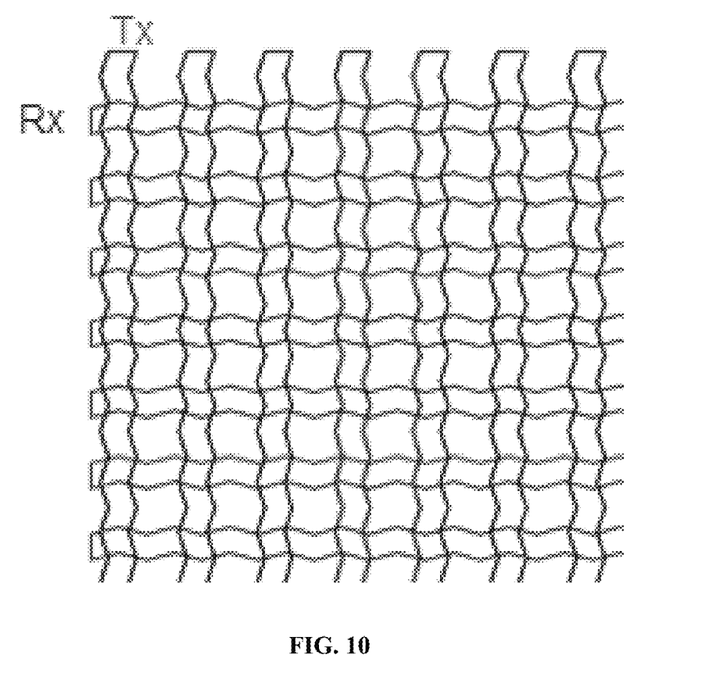
FIG. 10 is a diagram of a third exemplary structure of Rx lines and Tx lines of a mutual-capacitance fingerprint recognition device in accordance with some embodiments of the disclosed subject matter.

A third exemplary structure of Rx lines and Tx lines is shown in FIG. 10. As illustrated, each Tx line includes two parallel wavy lines. At one end the two parallel wavy lines are electrically connected, and at the other end the two parallel wavy lines are extending in a first direction. Similarly, each Rx line also includes two parallel wavy lines. At one end the two parallel wavy lines are electrically connected, and at the other end the two parallel wavy lines are extending in a second direction.

Figure 11:
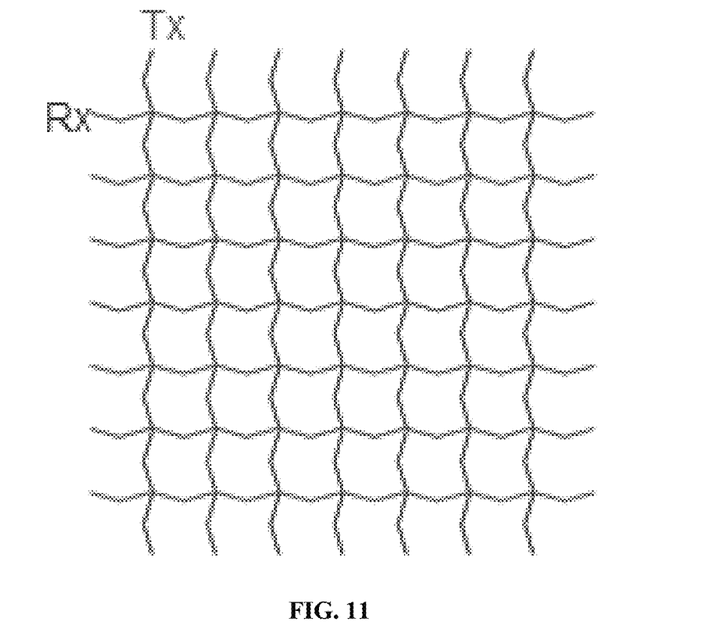
FIG. 11 is a diagram of a fourth exemplary structure of Rx lines and Tx lines of a mutual-capacitance fingerprint recognition device in accordance with some embodiments of the disclosed subject matter.

A fourth exemplary structure of Rx lines and Tx lines is shown in FIG. 11. Comparing to the first exemplary structure shown in FIG. 7, in the fourth exemplary structure, each of the Tx lines only includes a Tx main line but no branch lines. Each of the Rx lines also includes a Rx main line only but no branch lines.

Figure 12:
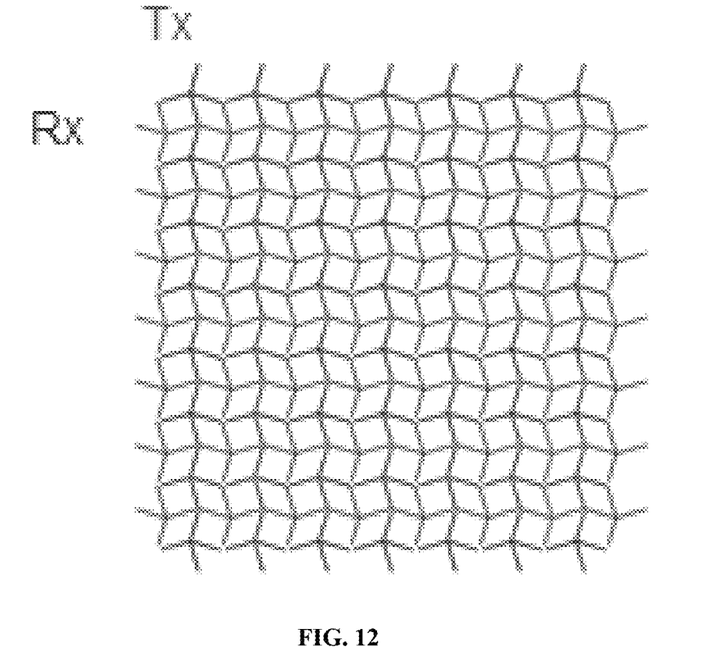
FIG. 12 is a diagram of a fifth exemplary structure of Rx lines and Tx lines of a mutual-capacitance fingerprint recognition device in accordance with some embodiments of the disclosed subject matter.

A fifth exemplary structure of Rx lines and Tx lines is shown in FIG. 12. Comparing to the first exemplary structure shown in FIG. 7, in the fifth exemplary structure, a distance between adjacent two Rx lines and a distance between adjacent two Tx lines are shorter.

Figure 13:
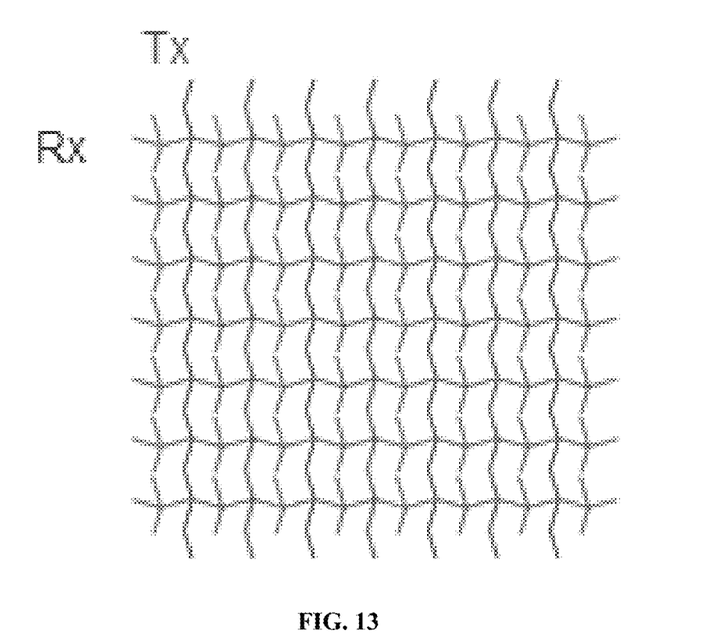
FIG. 13 is a diagram of a sixth exemplary structure of Rx lines and Tx lines of a mutual-capacitance fingerprint recognition device in accordance with some embodiments of the disclosed subject matter.

A sixth exemplary structure of Rx lines and Tx lines is shown in FIG. 13. Comparing to the second exemplary structure shown in FIG. 8, in the sixth exemplary structure, a distance between two adjacent Rx lines and a distance between two adjacent Tx lines are shorter by 20-50 um.

Figure 14:
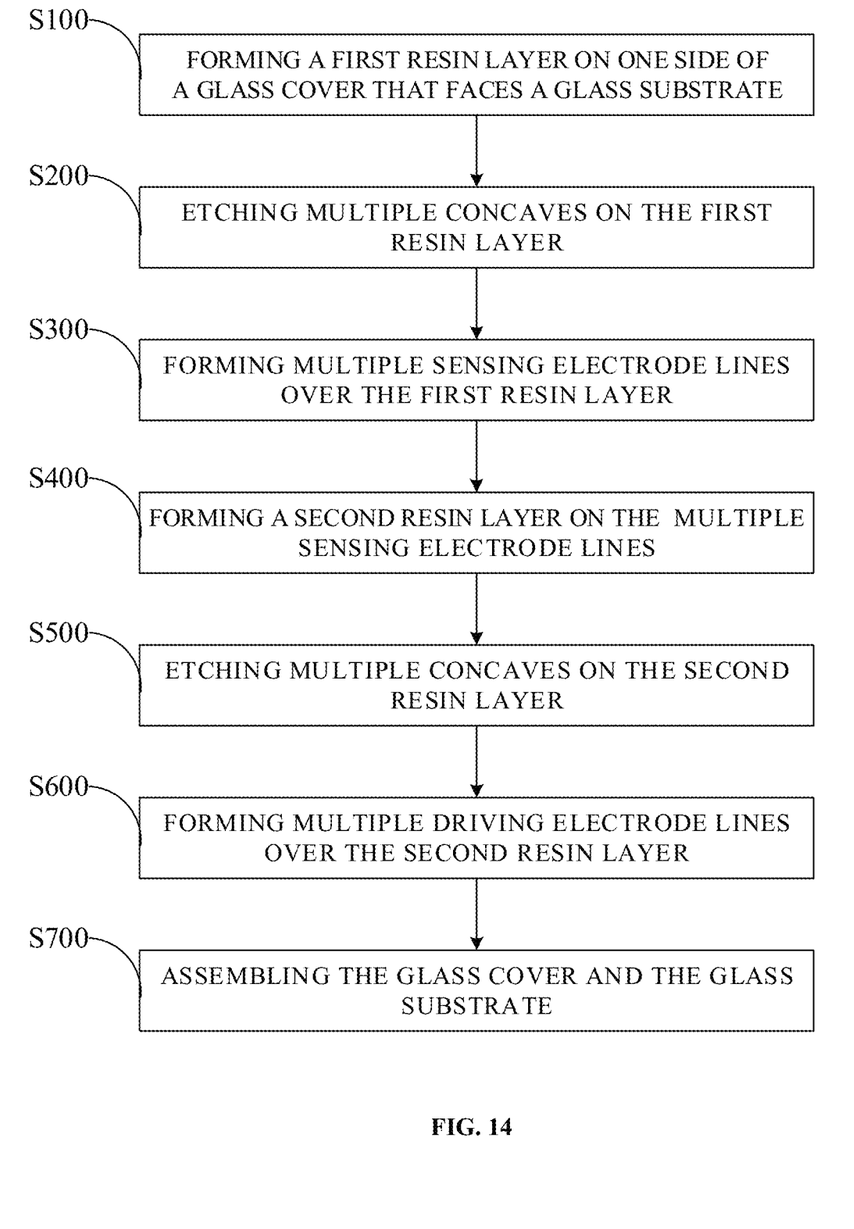
FIG. 14 shows an exemplary method for fabricating a mutual-capacitance fingerprint recognition device in accordance with some embodiments of the disclosed subject matter.

Turning to FIG. 14, an exemplary method for fabricating a mutual-capacitance fingerprint recognition device described above is shown in accordance with some embodiments of the disclosed subject matter.

As illustrated, the method can start at S100 by forming a first resin layer on one side of a glass cover that faces a glass substrate. In some embodiments, the first resin layer can be made by optically clear adhesive (OCA) material. The first resin layer can be formed by any suitable method, such as a spin-coating method.

At S200, multiple concaves can be etched on the first resin layer. In some embodiments, the multiple concaves can be wavily distributed on the first resin layer. The diameter of the multiple concaves can be around 3 µm, the depth of the multiple concaves can be about 4-5 µm. The multiple concaves can be etched by any suitable etching process.

At S300, multiple sensing electrode lines can be formed over the first resin layer. In some embodiments, the multiple sensing electrode lines can have wave-shaped convexes toward the glass cover as described above in connection with FIGS. 3-5. In some embodiments, the multiple sensing electrode lines can have any suitable structure described above in connection with FIGS. 6-13. The multiple sensing electrode lines can be formed by any suitable method, such as a magnetron sputtering method.

At S400, a second resin layer on the multiple sensing electrode lines. In some embodiments, the second resin layer can be made by optically clear adhesive (OCA) material. The second resin layer can be formed by any suitable method, such as a spin-coating method.

At S500, multiple concaves can be etched on the second resin layer. In some embodiments, the multiple concaves can be wavily distributed on the second resin layer. The diameter of the multiple concaves can be around 3 µm, the depth of the multiple concaves can be about 4-5 µm. The multiple concaves can be etched by any suitable etching process.

At S600, multiple driving electrode lines can be formed over the second resin layer. In some embodiments, the multiple driving electrode lines can have wave-shaped convexes toward the glass cover as described above in connection with FIGS. 3-5. In some embodiments, the multiple driving electrode lines can have any suitable structure described above in connection with FIGS. 6-13. The multiple driving electrode lines can be formed by any suitable method, such as a magnetron sputtering method.

At S700, the glass cover and the glass substrate can be assembled together.

It should be noted that the above steps of the flow diagram of FIG. 14 can be executed or performed in any order or sequence not limited to the order and sequence shown and described in the figure. Also, some of the above steps of the flow diagram of FIG. 14 can be executed or performed substantially simultaneously where appropriate or in parallel to reduce latency and processing times. Furthermore, it should be noted that FIG. 14 is provided as an example only. At least some of the steps shown in the figure may be performed in a different order than represented, performed concurrently, or altogether omitted. Some additional steps not shown in the figure may be performed between any of the steps shown in the figure.

Embodiments of the present disclosure can be implemented to realize fingerprint recognition functions. Embodiments of the present disclosure can also be implemented to realize other image or pattern recognition functions involving sensing and distinguishing various formations (e.g., valleys or ridges) of a surface.

In accordance with some embodiments, a display panel comprising a mutual-capacitance fingerprint recognition device described above is provided. The display panel can be any suitable display panel, such as a twisted nematic (TN) mode liquid crystal display (LCD) panel, a fringe-field switching (FFS) mode LCD panel, an Advanced Super Dimension Switch (ADS) mode LCD panel, an organic electroluminescent display panel, or any other suitable flat display panels.

In accordance with some embodiments, a display apparatus comprising the display panel described above is provided. The display apparatus can be any suitable apparatus that has a display function, such as a mobile phone, a tablet computer, a television, a monitor, a notebook computer, a digital camera, a digital picture frame, a navigation system, etc.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that the words, clauses, and/or phrased of directions and positions used herein (such as "above," "on," and the like) should not be interpreted as limiting the claimed subject matter to absolute directions or positions; rather, these are intended to illustrate only some of many possible relative directions or positions.

Accordingly, a mutual-capacitance fingerprint recognition device, a related fabricating method, a related display panel, and a related display apparatus are provided.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A mutual-capacitance touch sensing pattern recognition device, comprising:
   a plurality of sensing electrode lines; and
   a plurality of driving electrode lines;
   wherein:
   each of the plurality of sensing electrode lines includes a main line and at least one branch in a direction parallel to a plane containing the plurality of sensing electrode lines, the at least one branch being located between two neighboring ones of the plurality of driving electrode lines; and
   at least one set of the plurality of sensing electrode lines or the plurality of driving electrode lines has curved portions, the curved portion including a convex in a first portion, and a second portion being a region different from the first portion on a same sensing electrode line or driving electrode line, and
   a first dimension of the first portion is larger than a second dimension of the second portion, the first and second dimensions being measured, respectively, in a direction perpendicular to the plane containing the plurality of sensing electrode lines.

2. The mutual-capacitance touch sensing pattern recognition device of claim 1, wherein both sets of the plurality of sensing electrode lines and the plurality of driving electrode lines have the curved portions.

3. The mutual-capacitance touch sensing pattern recognition device of claim 1, wherein each of the plurality of sensing electrode lines has a plurality of wave-shaped convexes.

4. The mutual-capacitance touch sensing pattern recognition device of claim 1, wherein each of the plurality of driving electrode lines has a plurality of wave-shaped convexes.

5. The mutual-capacitance touch sensing pattern recognition device of claim 3, wherein each of the plurality of wave-shaped convexes is a hemispherical convex.

6. The mutual-capacitance touch sensing pattern recognition device of claim 5, wherein the hemispherical convex has a diameter of about 1 μm and 10 μm and a depth of about 1 μm and 10 μm.

7. The mutual-capacitance touch sensing pattern recognition device of claim 3, further comprising:
 a glass substrate and a glass cover; and
 a first resin layer between the plurality of sensing electrode lines and the glass cover, wherein the first resin layer comprises a plurality of wave-shaped concaves that correspond with the plurality of wave-shaped convexes of the plurality of sensing electrode lines.

8. The mutual-capacitance touch sensing pattern recognition device of claim 4, further comprising a second resin layer between the plurality of sensing electrode lines and the plurality of driving electrode lines, wherein the second resin layer comprises a plurality of wave-shaped concaves that correspond with the plurality of wave-shaped convexes of the plurality of driving electrode lines.

9. The mutual-capacitance touch sensing pattern recognition device of claim 1, wherein the at least one branch of each of the plurality of sensing electrode lines comprises:
 a first sensing electrode branch on a first side of the main line of each of the sensing electrode lines; and
 a second sensing electrode branch on a second side of the main line of each of the sensing electrode lines.

10. The mutual-capacitance touch sensing pattern recognition device of claim 9, wherein the sensing electrode main line is a wavy line.

11. The mutual-capacitance fingerprint recognition device of claim 10, wherein the first sensing electrode branch and the second sensing electrode branch are wavy lines.

12. The mutual-capacitance touch sensing pattern recognition device of claim 1, wherein each of the plurality of driving electrode lines comprises:
 a driving electrode main line; and
 a first driving electrode branch on a first side of the driving electrode main line;
 a second driving electrode branch on a second side of the driving electrode main line,
 wherein:
  the driving electrode main line, the first driving electrode branch, and the second driving electrode branch are in a direction parallel to a plane containing the plurality of driving electrode lines.

13. The mutual-capacitance touch sensing pattern recognition device of claim 12, wherein the driving electrode main line is a wavy line.

14. The mutual-capacitance touch sensing pattern recognition device of claim 13, wherein the first driving electrode branch and the second driving electrode branch are wavy lines.

15. The mutual-capacitance touch sensing pattern recognition device of claim 1, wherein:
 the plurality of sensing electrode lines are parallel with each other;
 the plurality of driving electrode lines are parallel with each other; and
 the plurality of sensing electrode lines are perpendicular with the plurality of driving electrode lines.

16. The mutual-capacitance touch sensing pattern recognition device of claim 15, wherein:
 a distance between neighboring sensing electrode lines is between 30 μm and 120 μm; and
 a distance between neighboring driving electrode lines is between 30 μm and 120 μm.

17. A display panel, comprising the mutual-capacitance touch sensing pattern recognition device according to claim 1.

18. A display apparatus, comprising the display panel according to claim 17.

19. The mutual-capacitance touch sensing pattern recognition device according to claim 1, further comprising:
 a glass cover;
 a first insulation layer between the plurality of sensing electrode lines and the glass cover; and
 a second insulation layer between the plurality of sensing electrode lines and the plurality of driving electrode lines,
 wherein at least one of the first insulation layer or the second insulation layer has concaves in a direction perpendicular to a plane of the glass cover.

20. A method for fabricating a mutual-capacitance touch sensing pattern recognition device, the method comprising:
 preparing a glass substrate and a glass cover; and
 forming a plurality of sensing electrode lines and a plurality of driving electrode lines between the glass substrate and the glass cover;
 wherein:
 each of the plurality of sensing electrode lines includes a main line and at least one branch in a direction parallel to a plane containing the plurality of sensing electrode lines, the at least one branch being located between two neighboring ones of the plurality of driving electrode lines; and
 at least one set of the plurality of sensing electrode lines or the plurality of driving electrode lines has curved portions, the curved portion including a convex in a first portion, and a second portion being a region different from the first portion on a same sensing electrode line or driving electrode line, and
 a first dimension of the first portion a is than a second dimension of the second portion, the first and second dimensions being measured, respectively, in a direction perpendicular to the plane containing the plurality of sensing electrode lines.

* * * * *